(12) United States Patent
Varga et al.

(10) Patent No.: US 6,774,913 B1
(45) Date of Patent: Aug. 10, 2004

(54) SYSTEM, METHOD, AND PROGRAM FOR SELECTIVELY MERGING PARTIAL OBJECTS

(75) Inventors: John Thomas Varga, Longmont, CO (US); Christopher Starbuck Kush, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,332

(22) Filed: May 15, 2000

(51) Int. Cl.⁷ .............................................. G06T 11/60
(52) U.S. Cl. ...................................................... 345/629
(58) Field of Search .............................. 358/450, 452, 358/453, 540; 345/637, 634, 629, 681, 682; 707/104, 5–7; 382/167

(56) References Cited

U.S. PATENT DOCUMENTS

| | | | |
|---|---|---|---|
| 5,454,071 A | | 9/1995 | Siverbrook et al. |
| 5,754,180 A | | 5/1998 | Kivolowitz et al. |
| 5,818,444 A | * | 10/1998 | Alimpich et al. ........... 345/765 |
| 5,835,095 A | | 11/1998 | Smith et al. |
| 5,949,425 A | * | 9/1999 | Willis .......................... 345/428 |
| 6,025,850 A | * | 2/2000 | Gupta .......................... 345/442 |
| 6,151,026 A | * | 11/2000 | Iwade et al. ................. 345/420 |
| 6,591,018 B2 | * | 7/2003 | Okuno et al. ............... 382/243 |
| 6,674,485 B2 | * | 1/2004 | Akiyama et al. ........... 348/586 |

* cited by examiner

*Primary Examiner*—Mark Zimmerman
*Assistant Examiner*—HueDung X. Cao
(74) *Attorney, Agent, or Firm*—Scott W. Reid; Dillon & Yudell, LLP (57) ABSTRACT

A system, method and program for merging objects for raster presentation are described. In response to receipt of an input data set including a plurality of objects intended for raster presentation, the system divides the data set into a plurality of scan regions and determines if a predetermined number of objects per scan line set is exceeded by the plurality of objects. In response to a determination that the predetermined number of objects per set of scan lines is exceeded, the system merges only a portion of a first object among the plurality of objects with at least a portion of a second object among the plurality of objects, where the portion of the first object and the portion of the second object are defined by a particular scan region among the plurality of scan regions.

37 Claims, 11 Drawing Sheets

SYSTEM, METHOD, AND PROGRAM FOR SELECTIVELY MERGING PARTIAL OBJECTS

This application is related to commonly-assigned, U.S. patent application Ser. No. 09/570,211, titled "METHOD, SYSTEM, AND LOGIC FOR SELECTING LINE WORK AND CONTROL DATA FOR A PIXEL FROM MULTIPLE OBJECTS OF LINE WORK DATA PROVIDED FOR THE PIXEL" and U.S. patent application Ser. No. 09/569,777, titled "METHOD, SYSTEM, PROGRAM, AND DATA STRUCTURE FOR GENERATING RASTER OBJECTS", which were filed May 12, 2000, and are both incorporated herein by reference.

BACKGROUND OF THE INVENTION

1. Technical Field

The present invention relates in general to document presentation by a presentation device, and, in particular, to efficient presentation of document pages containing numerous objects.

2. Description of the Related Art

In the context of printers and other presentation devices, a document is generally defined as a data collection that is logically subdivided into pages. A page may include various types of data, such as text and graphical objects (i.e., line work) and images (i.e., continuous tone (contone)), that are to be presented on one side of a physical sheet, subject to various formatting specifications, such as position, size, margins, etc. When printed, document pages are presented on sheets, which are physical media generally having at least two sides (e.g., a front side and a back side). Each side of a printed sheet may contain one or more pages.

To prepare a document page for presentation, a print processor of a printer must first convert the page from a page description language or vector graphics format into a bit-mapped image indicating a color or gray scale value to present at each pixel of the page. To create the bit-mapped image, the print processor may perform a number of data transformations, such as data compression, color space conversion and halftoning, on the various types of data that the page contains. Following print processing, the page data is printed on a physical sheet by one or more print heads.

For printers to attain higher resolutions and production rates, the data rate to the print head, and specifically, the performance of the print processor, must concomitantly increase. Two of the major barriers to accelerating print processing are the hardware-imposed limitations of the print processor regarding the number of line work and contone objects that can intersect each scan line and the number of priorities available for assignment to overlaid line work and contone objects. Because of these hardware-imposed limitations, the print processor must merge objects via microcode to reduce the number of graphical objects per scan line and/or free priority levels for assignment to additional overlaid graphical objects. For document pages containing a large number of objects, indiscriminate merging of graphical objects to satisfy the hardware-imposed limitations of the print processor consumes a significant amount of processing cycles of the print processor.

Thus, there is a need in the art to provide an improved method, system and program to efficiently process pages containing more than the allowed number of objects per scan line or a larger number of overlaid objects than available priorities.

SUMMARY OF THE INVENTION

A system, method and program for merging objects for raster presentation are described. In response to receipt of an input data set including a plurality of objects intended for raster presentation, the system divides the data set into a plurality of scan regions and determines if a predetermined number of objects per scan line set is exceeded by the plurality of objects. In response to a determination that the predetermined number of objects per set of scan lines is exceeded, the system merges only a portion of a first object among the plurality of objects with at least a portion of a second object among the plurality of objects, where the portion of the first object and the portion of the second object are defined by a particular scan region among the plurality of scan regions.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF ILLUSTRATIVE EMBODIMENT

Figure 1:
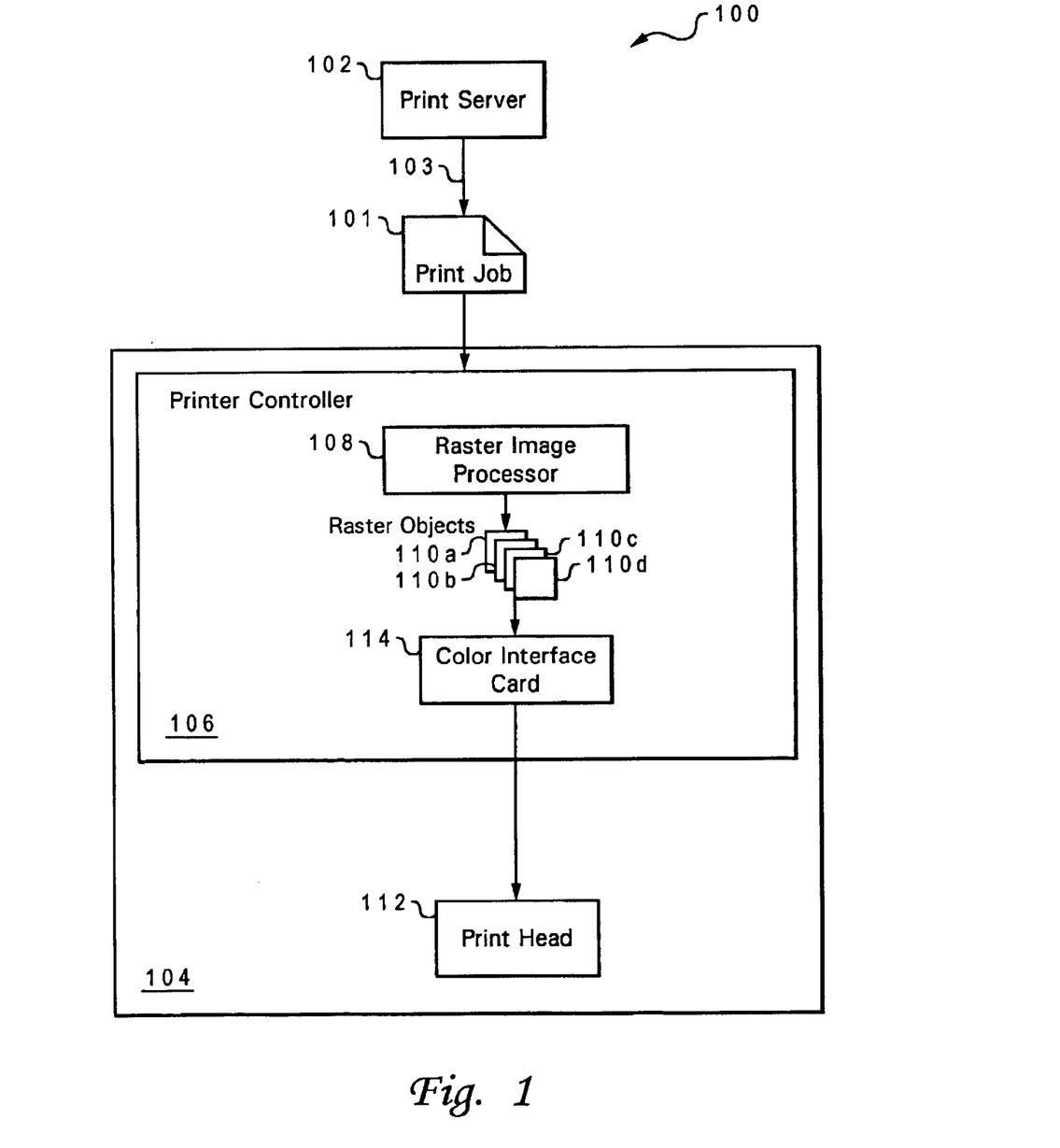
FIG. 1 is an exemplary block diagram of a printing system that divides a page of a document sheet into scan regions that define object merging and object priority boundaries in accordance with the present invention.

With reference now to FIG. 1, there is illustrated an exemplary block diagram of a printing system 100 in accordance with the present invention. As shown, printing system 100 includes a print server 102 coupled by a network or cable to a printer 104. Print server 102 manages document printing by printer 104 and provides printer 104 with a data stream 103 containing a print job 101 to be printed. Data stream 103 may be, for example, an Intelligent Printer Data Stream (IPDS), which is described in detail in *Data Stream and Object Architectures: Intelligent Printer Data Stream (IPDS) Reference*, Copyright IBM Corp. 1987, 1993, incorporated herein by reference.

Printer 104 may be implemented as a large scale printer, such as an IBM Infoprint® color printer, or as stand alone or network printer having a separate print server. Printer 104 receives data stream 103 at a printer controller 106, which, as shown, may be integral to printer 104 or alternatively may comprise a standalone computer, such as the IBM RS/6000®. Printer controller 106 includes a raster image processor (also known as a RIP or rasterizer) 108 that renders data for each document sheet specified in IPDS 103 into a bit-mapped format. In preferred embodiments, raster image processor 108 generates raster layers 110a–110d including the raster data. Each raster object includes pixel information for one color component supported by print head 112. For example, if print head 112 prints Cyan (C), Magenta (M), Yellow (Y) and black (K), then there would be one raster layer for each color component. Further, raster image processor 108 may produce separate raster layers for line work (text and graphics) and contone (images), thus providing eight separate raster layers, four for line work and four for contone.

In preferred embodiments, printer controller 106 also includes a hardware color interface card (CIC) 114 that combines the per-color raster objects 110 generated by raster image processor 108 according to a set of priorities associated with each type of raster object to produce a rasterized output that is printable by print head 112. By offloading processing from raster image processor 108 in this manner, CIC 114 accelerates the print processing performed by printer controller 106. In certain implementations, one CIC 114 may be capable of producing print data for only two of the four color planes (C, M, Y, and K). In such cases, two CICs 114 are needed to generate the final raster for all four color planes. In duplex implementations in which printer 104 prints on both sides of a sheet concurrently, four CICs 114 would be utilized, two for processing raster data for each side of a sheet. The CIC(s) 114 may be implemented, for example, with Field Programmable Gate Array (FPGA) logic mounted on a PCI card that can be inserted into the backplane of printer controller 106.

A CIC 114 is limited by hardware logic to a maximum of n (e.g., four) line work and m (e.g., four) contone objects per scan line per color, meaning that a maximum of N (e.g., 16) line work and M (e.g., 16) contone objects are permitted in a scan line. To combine these objects and obtain a renderable output, CIC 114 selects, for each pixel location, the object data of the object that has the highest relative priority (of P (e.g., sixteen) possible priorities) and that provides a non-transparent definition of the output. P, the number of possible priorities, also represents a hardware-imposed limitation to print processing in that if more than P objects are overlaid in a document page, CIC 114 cannot track the desired layering of the objects with the P priorities.

Because of these hardware-imposed limitations in CIC 114, if raster image processor 108 receives an input page specifying more than four line work or more than four contone objects in any scan line in an exemplary embodiment, raster image processor 108 will merge certain objects in microcode to meet the objects per scan line limitation of CIC 114. In order to reduce the number of processing cycles of raster image processor 108 consumed by merging objects, the present invention decomposes objects according to ranges of scan lines (hereinafter called scan regions) and merges objects and partial objects delimited by scan line boundaries. By permitting merger of partial objects by scan region rather than only permitting merger of complete objects, the area to be merged is reduced, thereby reducing the processing time devoted to merging objects and improving performance. The use of scan regions also addresses the limitation of CIC 114 as to the number of assignable priorities in that each scan region has a separate set of assignable priorities.

Figure 2A:
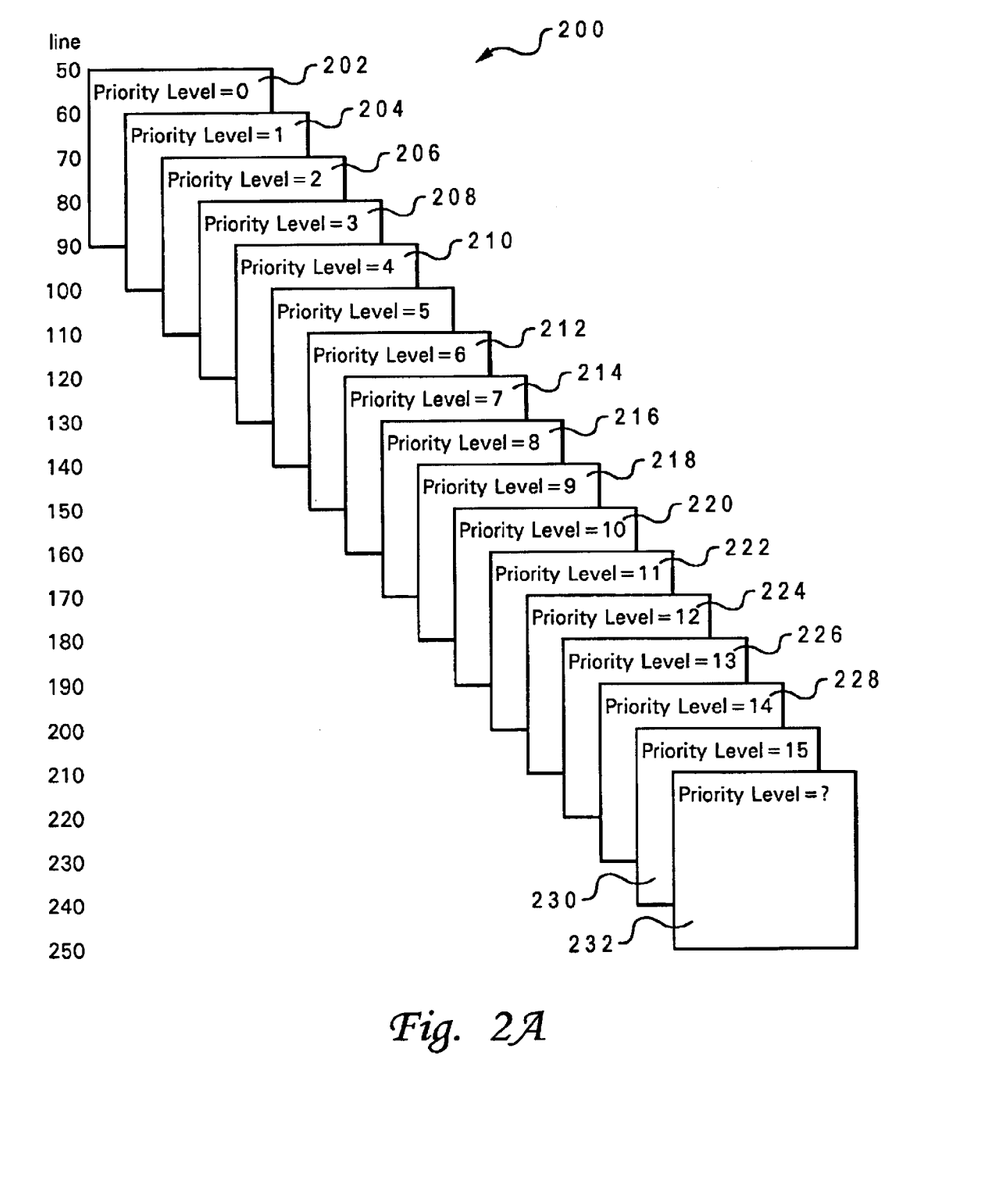
FIG. 2A illustrates a side of an exemplary document sheet having more overlaid objects than the maximum number of assignable priorities.
Figure 2B:
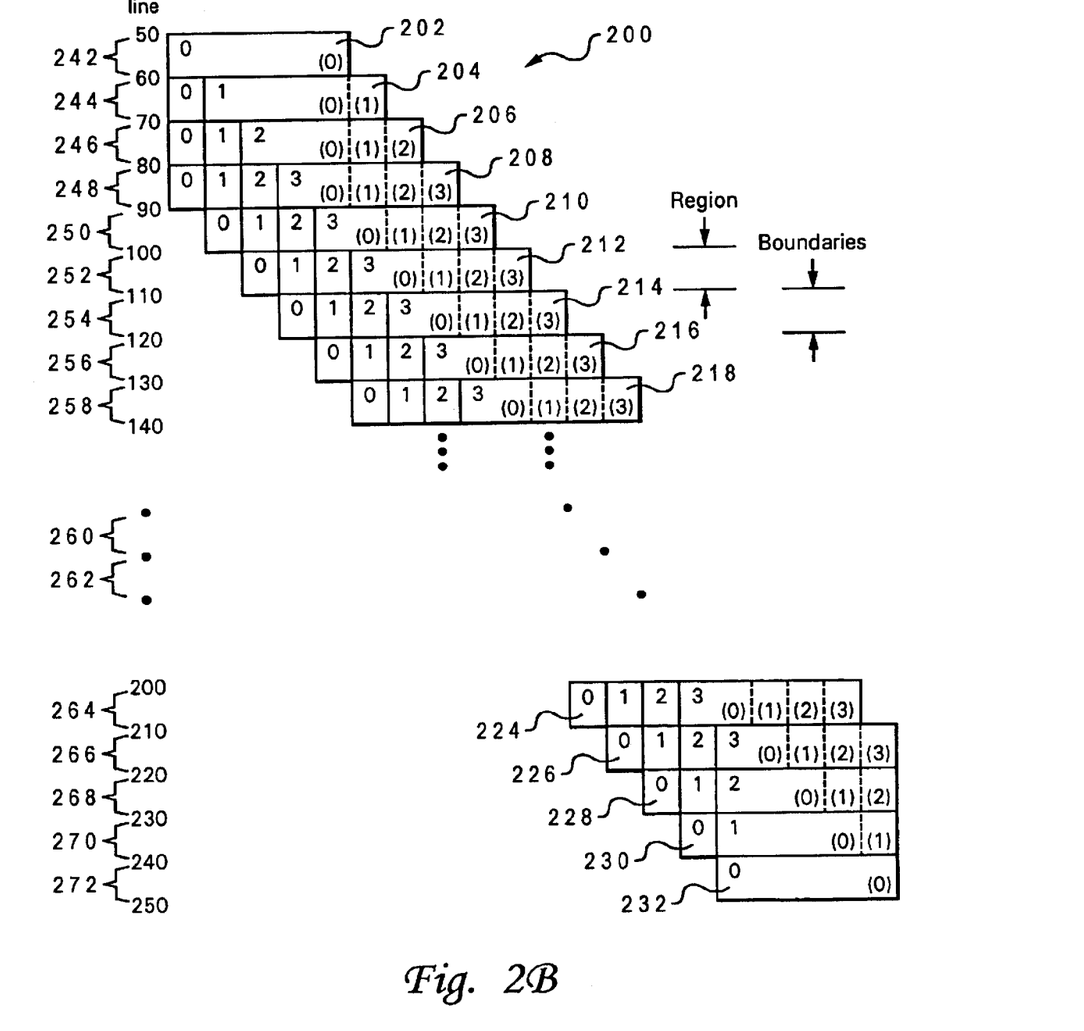
FIG. 2B depicts an exemplary division of the document sheet from FIG. 2A into scan regions in accordance with the present invention in order to provide sufficient priority levels.

Referring now to FIG. 2A, there is illustrated a side of an exemplary document sheet 200 containing a greater number of overlaid objects 202–232 than available priorities. As shown, each of objects 202–230 has an associated priority indicating its relative priority for presentation vis-à-vis other objects in the "stack" of overlaid objects. However, assuming that P, the maximum number of assignable priorities allowed by CIC 114, is 16, no priority level is available for assignment to object 232 since object 232 is the seventeenth overlaid object. To avoid merging object 232 into another object to satisfy the priority constraint of CIC 114, raster image processor 108 will divide the page displayed on document sheet 200 into multiple scan regions as shown in FIG. 2B (described below) utilizing the process shown in FIG. 4 (described below).

Figure 3A:
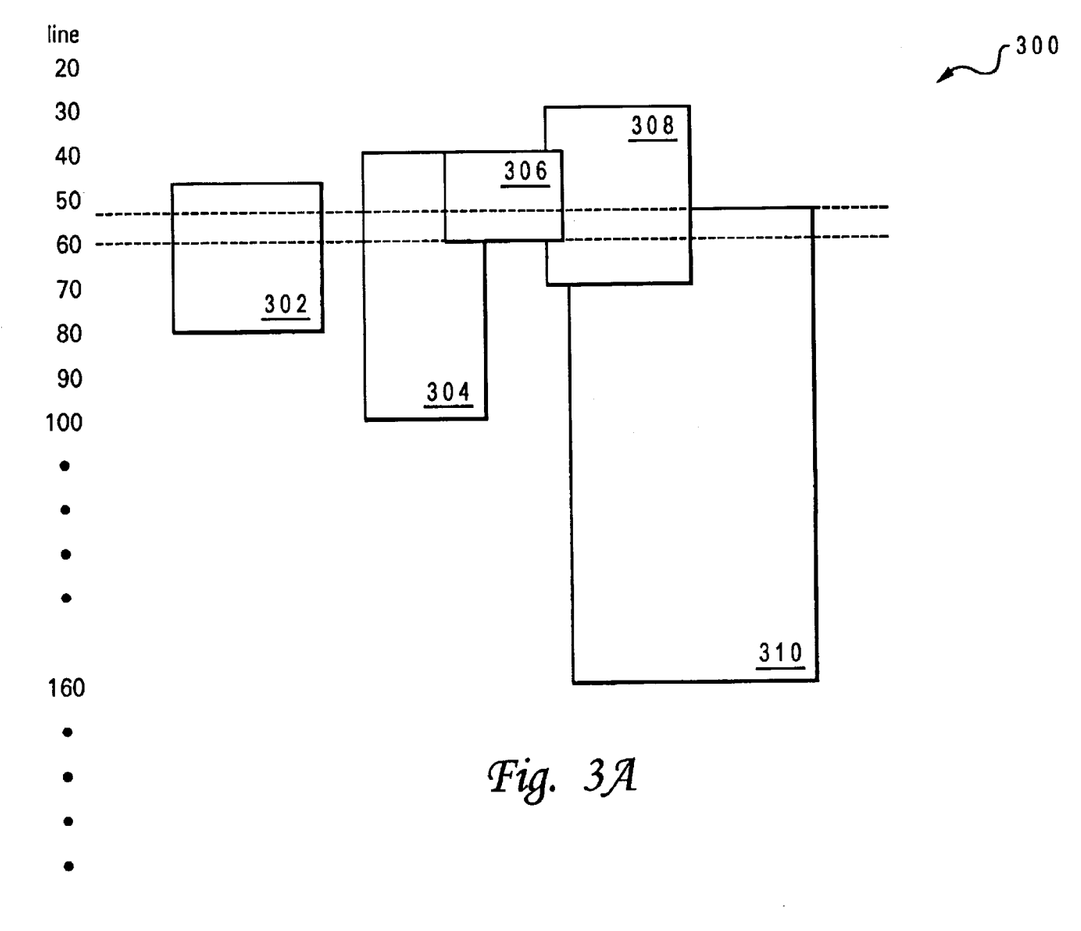
FIG. 3A illustrates a side of an exemplary document sheet having more than the allowed number of objects per scan line.
Figure 3B:
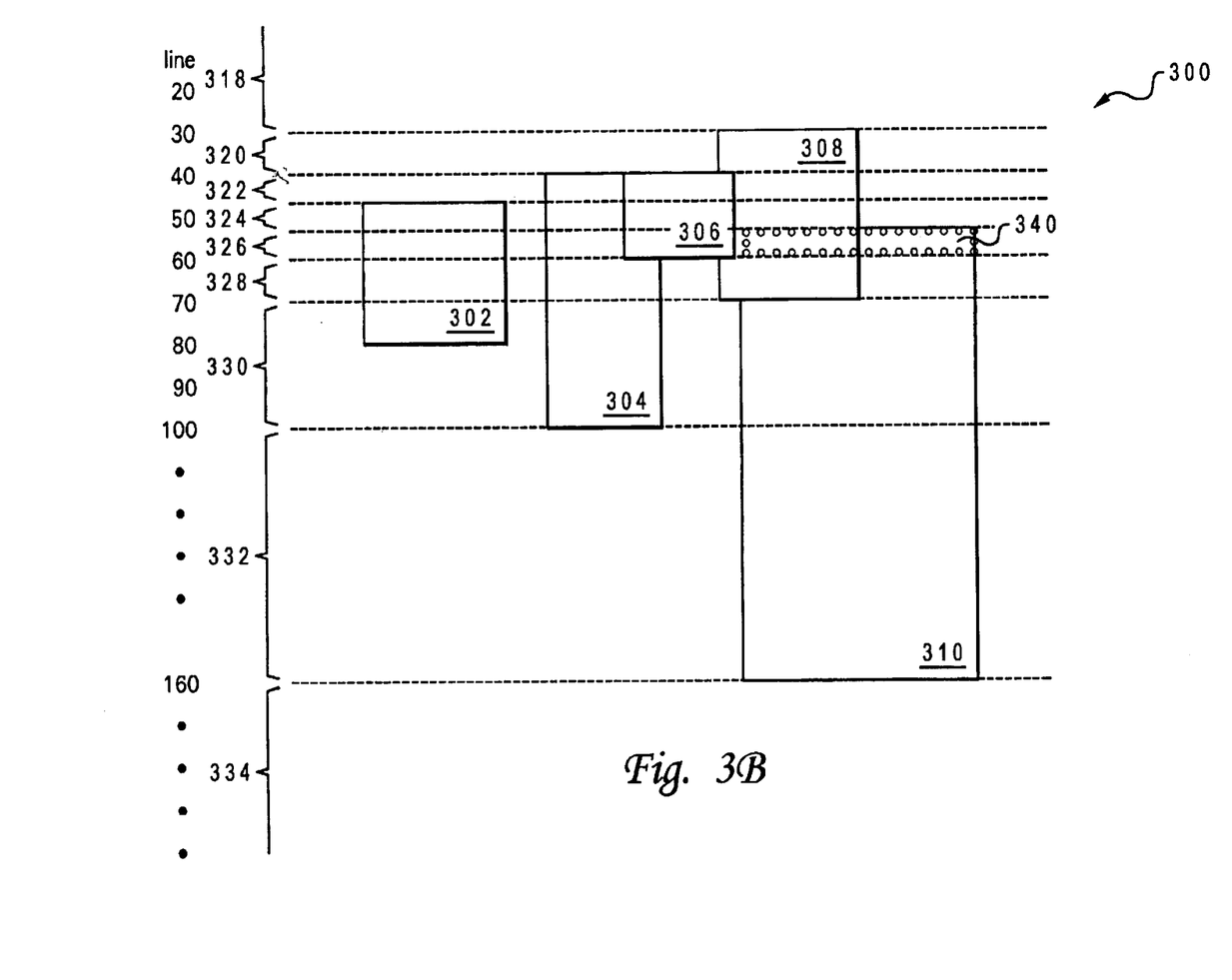
FIG. 3B depicts an exemplary division of the document sheet from FIG. 3A into scan regions defining boundaries along which partial object merging is performed in accordance with the present invention.

With reference now to FIG. 3A, there is illustrated a side of an exemplary document sheet 300 having more than the allowed number of objects per scan line. As shown, document sheet 300 contains line work objects 302–310 at various locations between scan lines 30 and 160. Assuming that objects 302–310 are of the same color, objects 302–310 cannot be presented by an exemplary implementation of CIC 114 without object merging by raster image processor 108 since scan lines 55 through 60 include one more object than the maximum of four. To efficiently perform such object merging, raster image processor 108 will divide the page displayed on document sheet 300 into multiple scan regions as shown in FIG. 3B (described below) utilizing the process shown in FIG. 4 (described below).

Figure 4:
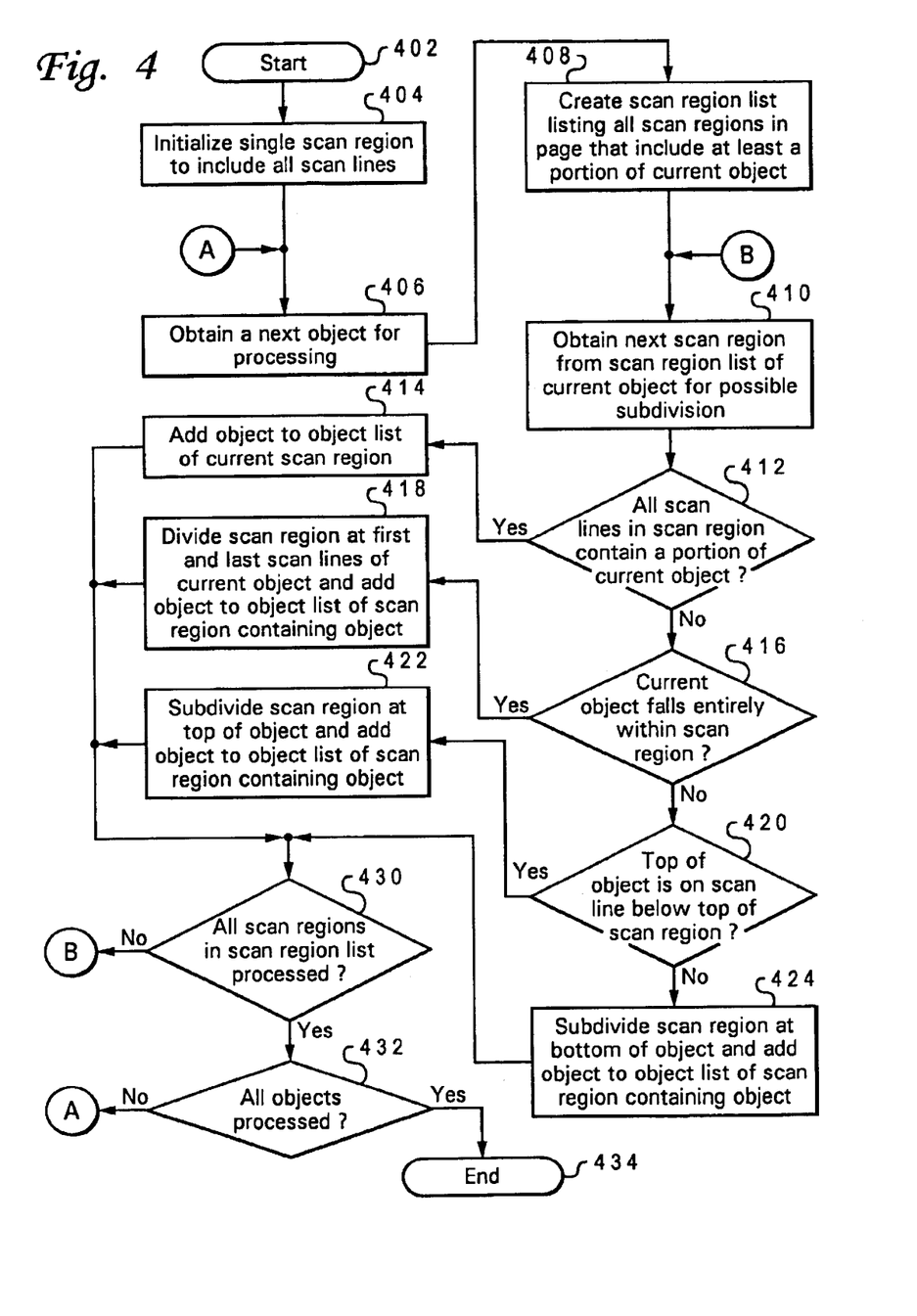
FIG. 4 is a high level logical flow chart of an exemplary method and program function for dividing a document page into scan regions in accordance with the present invention.

Referring now to FIG. 4, a high level logical flowchart of an exemplary method and program function for dividing a side of a document page into scan regions is shown. In preferred embodiments, the method shown in FIG. 4 is performed by raster image processor 108 after rasterization of a page into eight rasterized layers 110, four for line work and four for contone. The method is separately performed for each of the eight rasterized layers 110. It should be understood that the method of FIG. 4 is merely illustrative and that other useful variant and alternative methods will become apparent to persons of skill in the art.

The method depicted in FIG. 4 begins at block 402 and then proceeds to block 404, which illustrates raster image processor 108 generating an initial scan region including all scan lines in the rasterized layer. Raster image processor 108 then selects a next (or first) line work or contone object for processing, as shown at block 406. The method next proceeds to block 408, where raster image processor 108 creates a scan region list specifying all scan regions in the rasterized layer containing the current object. Method 400 then moves from block 408 to block 410, which shows raster image processor 108 obtaining a scan region from the list of scan regions to determine whether the scan region is to be subdivided.

Figure 5A:
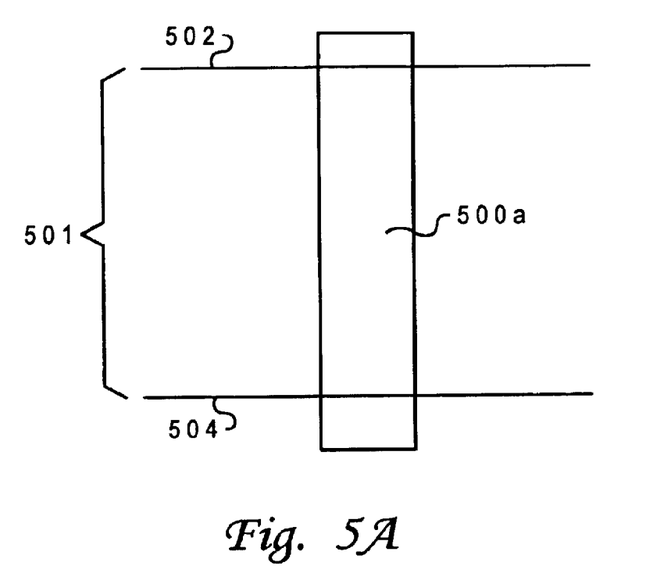
FIGS. 5A–5D show a scan region divided in various exemplary ways depending upon object position.

Following block 410, raster image processor 108 determines at block 412 whether or not all scan lines of the current scan region contain data for the current object. If so, then the current object is added to an object list of the current scan region, as shown at block 414. For example, FIG. 5A shows an object 500a having some object data within each scan line of a scan region 501 bounded by a top scan line 502 and a bottom scan line 504. According to blocks 412 and 414 of FIG. 4, object 500a is added to the object list of scan region 501.

Figure 5B:
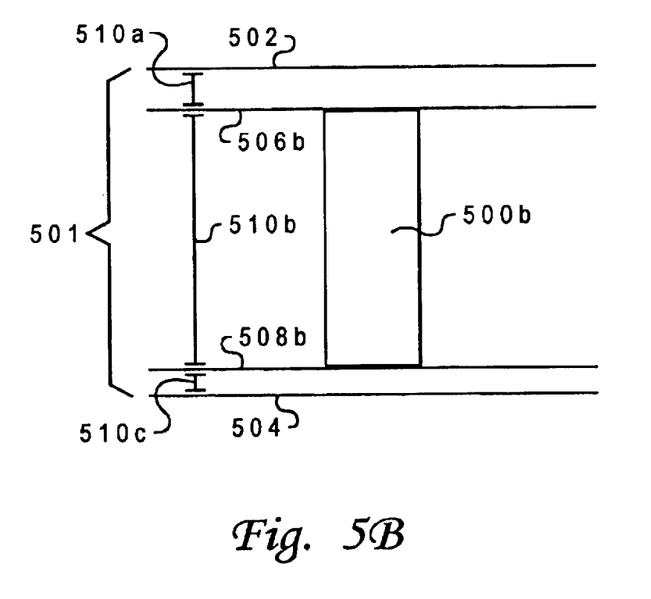

Referring again to FIG. 4, if raster image processor 108 determines at block 412 that all scan lines of the current scan region do not contain data for the current object, then the process shown in FIG. 4 proceeds to block 416. Block 416 depicts raster image processor 108 determining whether the current object falls entirely within the current scan region. If so, raster image processor 108 subdivides the current scan region at first and last scan lines of the current object and then adds the current object to the object list of the scan region containing the current object. With reference now to FIG. 5B, there is depicted an exemplary scan region 501 that entirely encompasses an object 500b and is therefore subdivided at a first scan line 506b and second scan line 508b of display item 500b according to the steps shown at blocks 416 and 418 of FIG. 4. Object 500b will then be added to the object list of scan region 510b, and objects formerly within the object list of scan region 501 (which no longer exists) will be added to the object lists of newly created scan regions 510a, 510b and 510c, as appropriate.

Figure 5C:
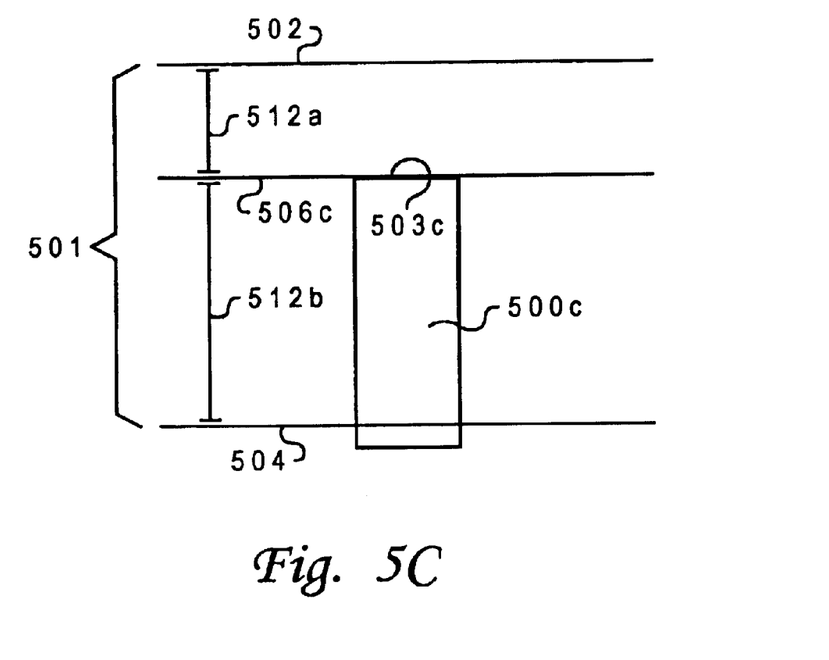

With reference again to FIG. 4, if a determination is made at block 416 that the current object does not fall entirely within the current scan region, then a determination is made at block 420 whether the top of the object is on a scan line below the top of the current scan region. If so, raster image processor 108 subdivides the current scan region at the top scan line of the current object and adds the current object to the object list of the scan region containing the current object. For example, FIG. 5C illustrates the subdivision of exemplary scan region 501 at top scan line 506c of display item 500c. Object 500c will then be added to the object list of the newly created scan region 512b defined between top scan line 506c and scan line 504 (the lower scan line of former scan region 501), and objects formerly within the object list of scan region 501 will be added to the object lists of scan region 512a and 512b, as appropriate.

Figure 5D:
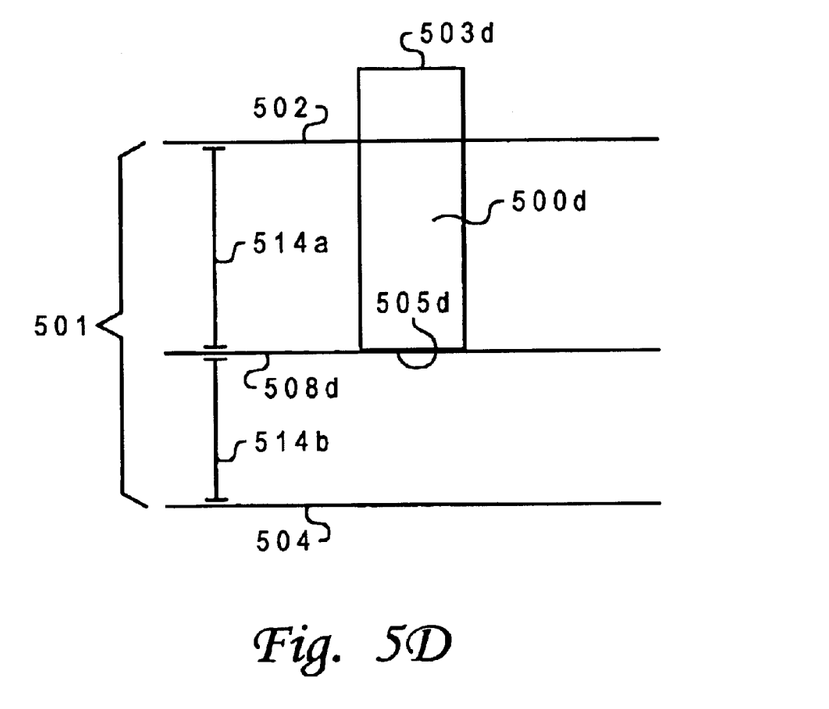

Referring again to block 420 of FIG. 4, if a determination is made that the top of the current object does not fall below the top of the current scan region, then raster image processor 108 subdivides the current scan region at the bottom scan line of the current object and adds the current object to the object list of the scan region containing the current object. As shown in FIG. 5D, a first scan line 503d of exemplary object 500d falls above top scan line 502 of scan region 501. Since scan region 501 does not contain all scan line of object 500d, raster image processor 108 therefore subdivides scan region 501 at a bottom scan line 505d of object 500d and adds object 500d to the object list of newly created scan region 514a, which is bounded by scan line 502 (the upper scan line of former scan region 501) and bottom scan line 505d. As before, other objects within the object list of scan region 501 are added to the object lists of newly created scan regions 514a and 514b, as appropriate.

Returning to FIG. 4, following any of blocks 414, 418, 422 and 424, raster image processor 108 determines at block 430 whether all scan regions in the scan region list of the current object have been processed. If not, the process returns through page connector B to block 410, which is described above. However, if all scan regions in the scan region list of the current object have been processed, the process proceeds from block 430 to block 432, which illustrates a determination of whether any other objects in the rasterized layer remain to be processed. If so, the process returns through page connect A to block 406, which is described above. However, if raster image processor 108 determines at block 432 that all objects in the current rasterized layer have been processed, then the method of dividing a page into scan regions shown in FIG. 4 ends at block 434.

Following the division of each of the rasterized layers generated by raster image processor 108 into scan regions that define priority and merging boundaries, raster image processor 108 examines the scan regions in each rasterized layer to determine if any object merging is required to satisfy the hardware limitations of CIC 114, and if so, to determine how such object merging can most efficiently be accomplished. An exemplary process by which raster image processor 108 determines whether object merging is required and selects objects for merging is depicted in FIGS. 6A and 6B.

The depicted process can attempt to satisfy the object per scan line limitation of CIC 114 either precisely by examining the object count of each individual scan line or imprecisely by merely examining the object count of each scan region. It is preferable to precisely implement the object per scan line limitation of CIC 114 if the processing burden associated with examining each scan line for compliance with the object per scan line constraint of the CIC 114 is less than that associated with unnecessarily merging objects according to the imprecise implementation. Alternatively, if the object count of each scan region is a fairly good approximation of the per scan line object count, it is preferable to apply the object constraint of CIC 114 to scan regions to accelerate print processing. Hereinafter, an imprecise implementation will be assumed.

Figure 6A:
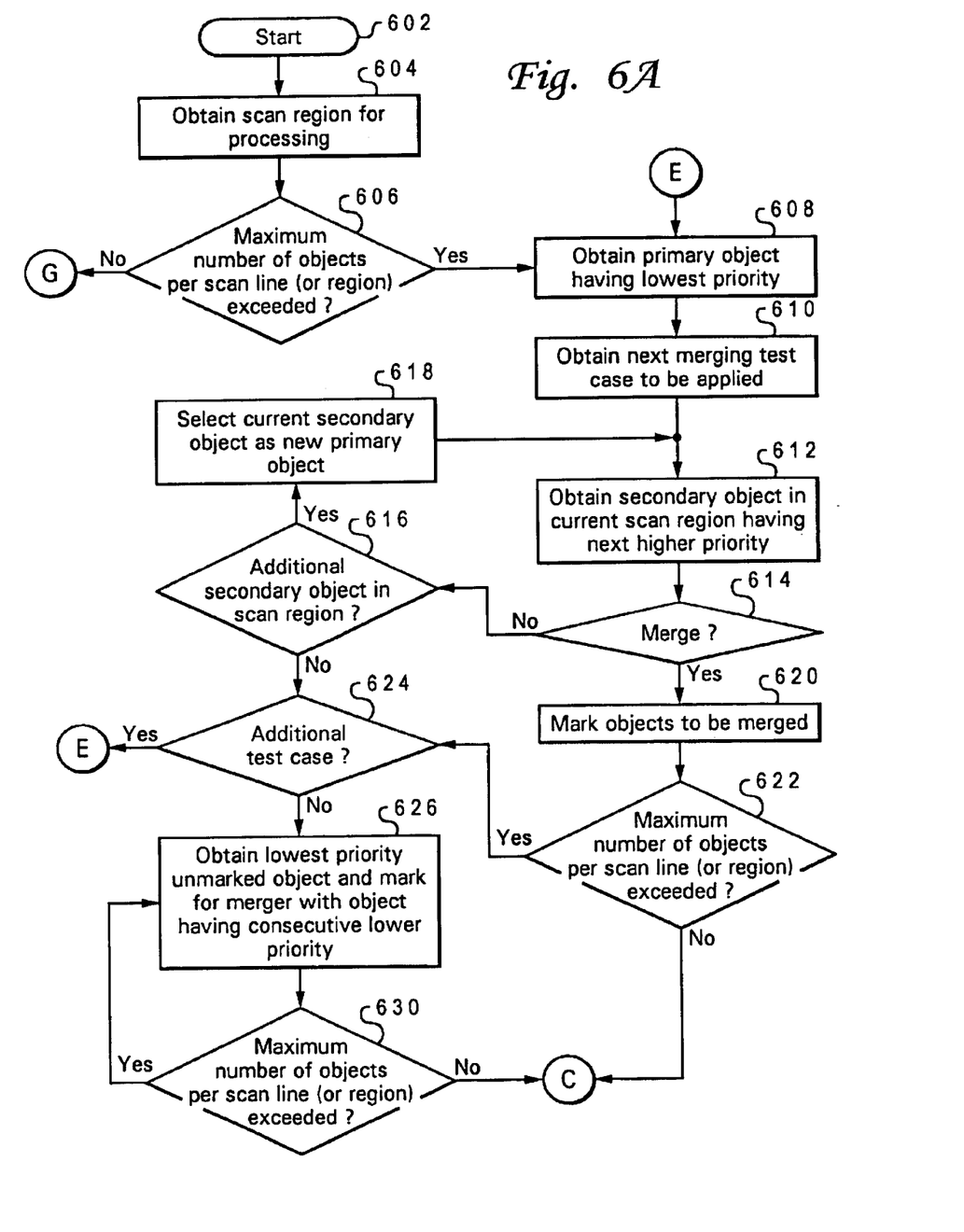
FIGS. 6A and 6B together form a high level logical flow chart of an exemplary method and program function for merging objects within scan regions containing more than the maximum number of objects per scan line or scan region.
Figure 6B:
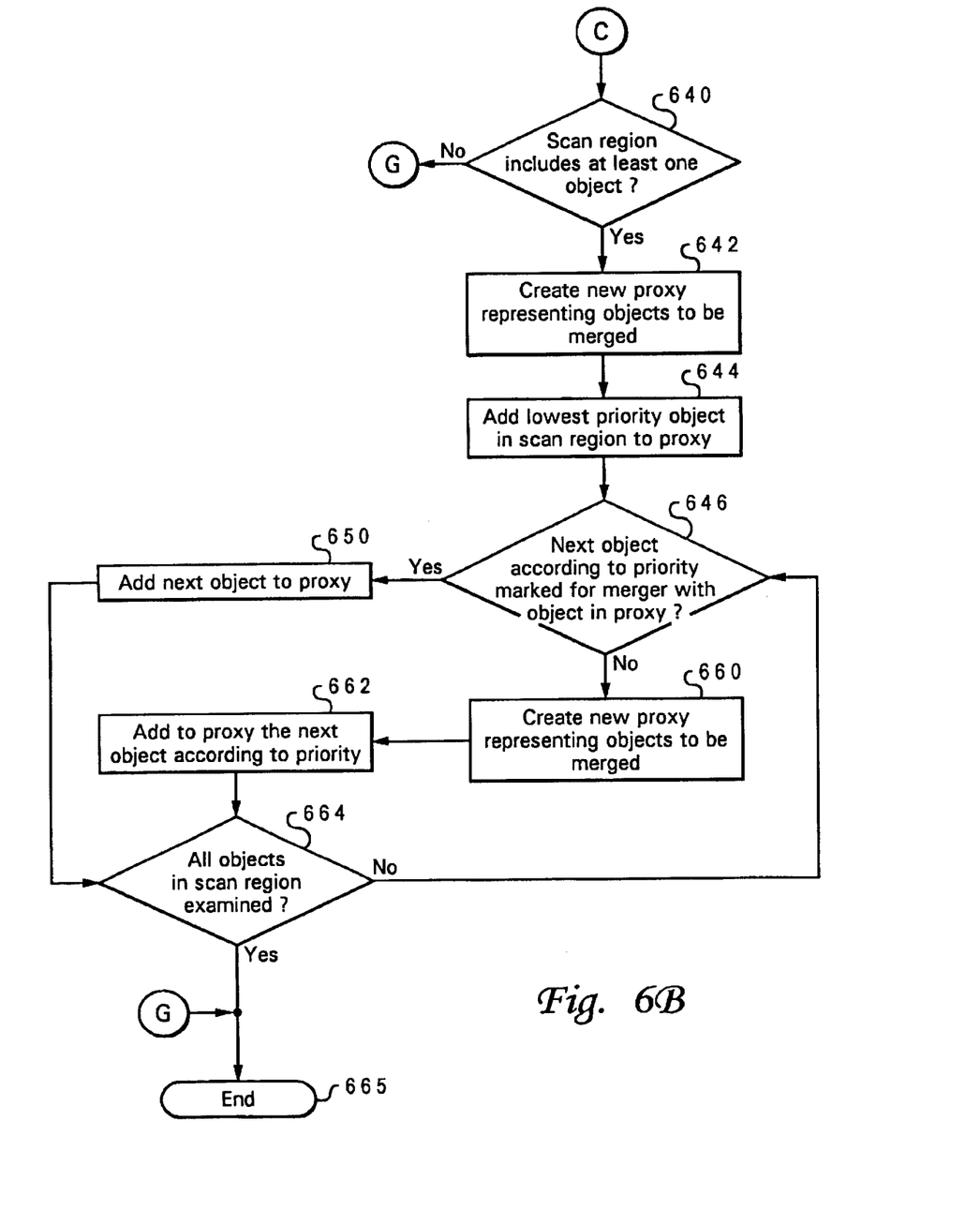

Referring first to FIG. 6A, the process begins at block 602 and then proceeds to block 604, which illustrates raster image processor 108 selecting the scan region of the rasterized layer that will be considered throughout the steps shown in FIGS. 6A and 6B (i.e., the depicted process is repeated for each scan region of each rasterized layer). Raster image processor 108 then determines whether the maximum number of objects per scan region is exceeded. If not, the process proceeds through page connector G and terminates at block 665 of FIG. 6B. However, if raster image processor 108 determines that the maximum number of objects per scan region is exceeded, then raster image processor 108 obtains the lowest priority object in the scan region as a candidate for merging with other objects in the scan region, as shown at block 608. For clarity, the two objects currently under consideration for merging at any time are termed the "primary object" and the "secondary object."

The process proceeds from block 608 to block 610, which depicts raster image processor 108 obtaining a next test case (or criterion) among a plurality of test cases used to determine whether pairs of primary and secondary objects are to be merged. Exemplary test cases may include the following rank-ordered criteria that raster image processor 108 applies, as needed, to determine whether primary and secondary objects of consecutive assigned priorities are to be merged:

primary and secondary objects are
1) rectangles of same color;
2) a bi-level (text or image) or rectangle with another bi-level or rectangle of the same color that starts at locations that are a multiple of four pixels apart along the scan line;
3) non-overlapping single color objects using a common mask per object that starts at locations which are a multiple of four pixels apart along the scan line ("Common mask per display item" implies the control bits are used for all the color planes instead of requiring multiple control bits);
4) single-color objects using a common mask per object that start at locations which are a multiple of four pixels apart along the scan line;
5) non-overlapping objects using a common mask per object that start at locations which are a multiple of four pixels apart along the scan line;

6) contone (CT) shadow with a object using a common mask;

7) single-color objects using a common mask per display item;

8) non-overlapping objects with a common mask per object;

9) single-color objects having the same color;

10) objects using a common mask per object; or 11) non-overlapping objects.

Following block 610, raster image processor 108 obtains an object with the next higher consecutively assigned priority (than the primary object), which will be utilized as the secondary object, as shown at block 612. Raster image processor 108 then applies the current test case to the primary and secondary objects to determine whether the objects should be merged. If a determination is made at block 614 that the primary and secondary objects are not to be merged, a determination is made at block 616 whether additional secondary objects are within the scan region. If so, the process passes to block 618, which represents selecting the current secondary object as a new primary object, and then returns to block 612, which has been described. If, however, raster image processor 108 determines at block 616 that all possible secondary objects in the scan region have been tested for merging with the primary object, the process proceeds to block 624, which is described below.

Returning to block 614, in response to a determination that the primary and secondary objects are to be merged, raster image processor 108 marks the objects for merging, as shown at block 620, and then determines at block 622 if merging these objects will reduce the number of objects in the scan region (or scan line) to the maximum number per scan line allowed by CIC 114. If so, the process proceeds through page connector C to block 640 of FIG. 6B. However, if merger of the objects still does not reduce the number of objects in the scan region to the maximum allowed by CIC 114, the process proceeds to block 624.

Block 624 illustrates raster image processor 108 determining whether any test case within the list of test cases has not yet been applied. If a test case remains that has not yet been applied, the process passes through page connector E to block 608, which illustrates raster image processor 108 again selecting the lowest priority object in the scan region as the primary object and then repeating the process of selecting objects to merge utilizing the new test case. However, if a determination is made at block 624 that all test cases have been applied, an accelerated process for selecting objects to be merged is employed, as shown at blocks 626 and 630.

Block 626 represents raster image processor 108 obtaining the lowest priority object in the scan region that is not marked for merger and marking that object and the object having the consecutive lower priority for merger. Next, at block 630, raster image processor 108 again determines whether following merger of all marked objects, the object per scan line constraint of CIC 114 is satisfied. If so, the process proceeds through page connector C to block 640 of FIG. 6B. If not, the process returns to block 626, which has been described. At the conclusion of the portion of the process depicted in FIG. 6A, all objects that will be merged by raster image processor 108 are marked.

With reference now to FIG. 6B, the objects marked for merger in FIG. 6A are efficiently merged by merging only pieces of marked objects that are within the same scan region. The process illustrated in FIG. 6B begins at block 640, which depicts raster image processor 108 determining whether the current scan region includes a portion of at least one object. If not, the process passes through page connector G to block 665 and terminates. However, if a determination is made at block 640 that the scan region includes a portion of at least one object, raster image processor 108 creates a proxy, as shown at block 642. A proxy is defined as a pseudo line work or contone item that refers to one or more objects of the corresponding type and contains a description of the pieces of the objects to be merged. The line work and contone objects referenced by a proxy preferably have suitable object interfaces that are capable of producing the required ranges of rasterized data required for merging. As shown at block 644, raster image processor 108 then adds a description of the portion of the lowest priority object in the current scan region to the proxy. Next, as depicted at block 646, raster image processor 108 examines the object in the scan region with the next consecutively higher priority to determine whether the object has been marked for merging with an object in the current proxy. If so, the process proceeds to block 650, which illustrates raster image processor 108 adding to the current proxy a description of the portion of the next object to be merged.

Raster image processor 108 then determines at block 664 whether or not all objects in the current scan region have been examined in the merging process. If so, the process terminates at block 665; however, if a determination is made at block 664 that additional objects in the current scan region have not yet been examined, the process returns to block 646. At block 646 if raster image processor 108 determines that the next object in the scan region according to sequentially ascending priority is not marked for merging with an object referenced in the current proxy, raster image processor 108 creates a new proxy at block 660. Following block 660, raster image processor 108 adds a description of the portion of the next object (identified at block 646) within the scan region to the new proxy, as illustrated at block 662. Raster image processor 108 then again determines whether all objects in the scan region have been examined for merging, as depicted at block 664. If not, the process returns to block 646, as described above. However, if all objects have been examined for merging, then the process depicted in FIG. 6B terminates at block 665. Thereafter, raster image processor 108 merges the portions of the objects referenced by each proxy to meet the object per scan line constraints of CIC 114. The rasterized layers can then be provided to CIC 114 for further processing, and ultimately delivery to printhead 112.

As noted above, the processes illustrated in FIGS. 4, 6A and 6B address both the priority and object per scan line limitations of CIC 114. For example, referring now to FIG. 2B, there is depicted an exemplary division of the document sheet from FIG. 2A into scan regions in accordance with the method of FIG. 4 in order to provide sufficient priority levels. The method of FIG. 4 divides document sheet 200 into scan regions 242–272 along the edges of objects 202–232, with each scan region having a respective set of assignable priorities. The priorities of objects within each scan region are shown. Importantly, by dividing document sheet 200 into scan regions in this manner, a priority (priority 0) can be assigned to object 232, even though document sheet contains a greater number of overlaid objects than priority levels.

The grouping of scan lines into scan regions also enables efficient merging of objects when the object per scan line limitation of CIC 114 is exceeded, as shown in FIG. 3B. FIG. 3B depicts the exemplary division of the document sheet 300 from FIG. 3A into scan regions 318–334 defining boundaries along which partial object merging is performed in accordance with the present invention. Thus, according to the process shown in FIG. 6A, scan region 326 is the only scan region identified as requiring object merging since all other scan regions have four or fewer objects. The process shown in FIG. 6B generates a proxy specifying only the area 340 containing portions of objects 308 and 310 for merging, rather than designating two entire objects for merging. In this manner, the object per scan line constraint of CIC 114 is met over scan lines 55–60, while greatly reducing merging area and therefore merge processing by raster image processor 108.

Those skilled in the art will appreciate the numerous extensions to or variations of the present invention are possible and may be desirable, depending upon factors that are implementation and data-specific.

For example, object storage may be utilized inefficiently, thereby degrading performance, if the amount of data storage devoted to object overhead (e.g., object headers) is too large relative to the amount of object data. In such cases, it may be desirable to merge objects even if not required by a CIC-imposed constraint, in order to improve object storage efficiency. One manner to accomplish such object merging is to imprecisely implement the object constraint on a per scan region basis and to also define a minimum size for scan regions. In this manner, objects within scan regions will tend to be combined, thus improving the header-to-data ratio in object storage. Elective object merging can also be accomplished by combining two or more scan ranges into larger scan ranges.

Figure 7:
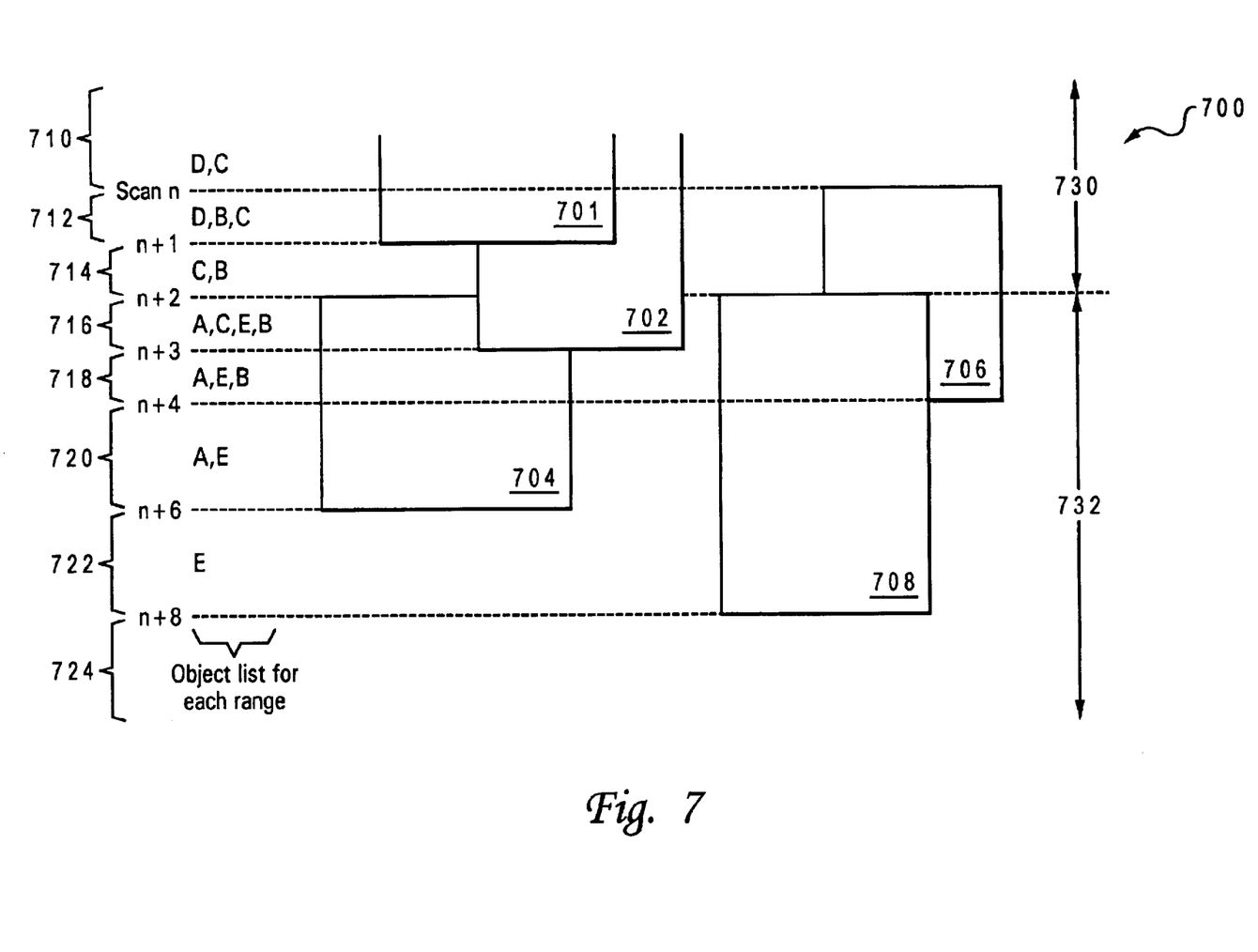
FIG. 7 depicts combining scan regions in accordance with the present invention.

Scan ranges may also be combined into larger scan ranges to optimize the size of scan ranges, thus eliminating needless tracking and processing of scan ranges. For example, FIG. 7 illustrates objects 702–708 within an exemplary document sheet 700 that was originally divided into scan regions 710–724 by the process depicted in FIG. 4. By examining the illustrated object list of each scan range, raster image processor 108 can determine whether the scan regions are optimized, that is, whether the scan regions have the maximum or close to the maximum number of objects. If not, raster image processor 108 can combine two or more scan regions into a single scan region. In FIG. 7, scan regions 710–714 can be combined into a larger scan region 732 since the imprecise four object per scan region constraint will not be exceeded. Similarly, at least scan ranges 716–724 can also be combined. In this manner, the number of scan regions that need to be managed during print processing can be advantageously reduced.

As has been described, the present invention provides an improved method, system and program for dividing a data set (e.g., page) into scan regions that define boundaries for object priority and object merging. Through use of such scan regions, hardware limitations of a print processor regarding the number of objects allowed per scan line and the number of available object priorities can be observed without limiting permitted composition of a document page and without unnecessarily burdening the print processor with object merging.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention can alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of merging objects for raster presentation, said method comprising:

in response to receipt of an input data set including a plurality of objects intended for raster presentation, dividing the data set into a plurality of scan regions and determining if a predetermined number of objects per scan line set is exceeded by said plurality of objects; and in response to a determination that the predetermined number of objects per set of scan lines is exceeded, merging only a portion of a first object among said plurality of objects with at least a portion of a second object among said plurality of objects, wherein said portion of said first object and said portion of said second object defined by a particular scan region among said plurality of scan regions.

2. The method of claim 1, and further comprising assigning presentation priorities to objects within each scan region independently.

3. The method of claim 1, and further comprising rasterizing said plurality of objects into raster objects prior to said merging.

4. The method of claim 1, and further comprising thereafter printing said plurality of objects on a single side of a sheet.

5. The method of claim 1, wherein dividing the data set comprises subdividing at least one of said plurality of scan regions into multiple scan regions based upon a position of an object among said plurality of objects in relation to scan region boundaries.

6. The method of claim 1, wherein said scan line set is a single scan line, and wherein determining if a predetermined number of object per scan line set is exceeded comprises determining if a predetermined number of objects per scan line is exceeded.

7. The method of claim 1, wherein said scan line set comprises a scan region, and wherein determining if a predetermined number of object per scan line set is exceeded comprises determining if a predetermined number of objects per scan region is exceeded.

8. The method of claim 1, each of said plurality of objects having at least one associated presentation priority, said method further comprising selecting said first and second objects for merging based upon said first and second objects having close priorities.

9. The method of claim 1, and further comprising defining a plurality of ordered criteria for object merging and selecting said first and second objects for merging by applying said criteria in order to objects among said plurality of objects within said particular scan region.

10. The method of claim 1, wherein merging comprises creating a proxy object specifying said portion of said first object and said portion of said second object to be included within a merged object.

11. The method of claim 1 and further comprising enforcing a minimum size for each of the plurality of scan regions.

12. The method of claim 1, and further comprising combining at least two of the plurality of scan regions into a single scan region.

13. A printing system comprising:
   means, responsive to receipt of an input data set including a plurality of objects intended for raster presentation, for dividing the data set into a plurality of scan regions and for determining if a predetermined number of objects per scan line set is exceeded by said plurality of objects; and
   means, responsive to a determination that the predetermined number of objects per set of scan lines is exceeded, for merging only a portion of a first object among said plurality of objects with at least a portion of a second object among said plurality of objects, wherein said portion of said first object and said portion of said second object defined by a particular scan region among said plurality of scan regions.

14. The printing system of claim 13, further comprising means for assigning presentation priorities to objects within each scan region independently.

15. The printing system of claim 13, further comprising means for rasterizing said plurality of objects into raster objects prior to said merging.

16. The printing system of claim 15, wherein said means for rasterizing comprises a raster image processor that outputs rasterized color planes, and wherein said printing system further comprises color interface hardware that combines said rasterized color planes into a renderable output data set.

17. The printing system of claim 13, further comprising a print head that prints said plurality of objects on a single side of a sheet.

18. The printing system of claim 13, further comprising means for subdividing at least one of said plurality of scan regions into multiple scan regions based upon a position of an object among said plurality of objects in relation to scan region boundaries.

19. The printing system of claim 13, wherein said scan line set is a single scan line.

20. The printing system of claim 13, wherein said scan line set comprises a scan region.

21. The printing system of claim 13, wherein each of said plurality of objects has at least one associated presentation priority, and wherein said printing system further comprises means for selecting said first and second objects for merging based upon said first and second objects having close priorities.

22. The printing system of claim 13, further comprising means for selecting said first and second objects for merging by applying a plurality of criteria in order to objects among said plurality of objects within said particular scan region.

23. The printing system of claim 13, further comprising means for creating a proxy object specifying said portion of said first object and said portion of said second object to be included within a merged object.

24. The printing system of claim 13, further comprising means for enforcing a minimum size for at least some of the plurality of scan regions.

25. The printing system of claim 13, further comprising means for combining at least two of the plurality of scan regions into a single scan region.

26. An article of manufacture comprising a computer readable medium having program logic embodied therein for causing control logic to perform:
   in response to receipt of an input data set including a plurality of objects intended for raster presentation, dividing the data set into a plurality of scan regions and determining if a predetermined number of objects per scan line set is exceeded by said plurality of objects; and
   in response to a determination that the predetermined number of objects per set of scan lines is exceeded, merging only a portion of a first object among said plurality of objects with at least a portion of a second object among said plurality of objects, wherein said portion of said first object and said portion of said second object defined by a particular scan region among said plurality of scan regions.

27. The article of manufacture of claim 26, further comprising program logic for causing the control logic to perform assigning presentation priorities to objects within each scan region independently.

28. The article of manufacture of claim 26, further comprising program logic for causing the control logic to perform rasterizing said plurality of objects into raster objects prior to said merging.

29. The article of manufacture of claim 26, further comprising program logic for causing the control logic to perform printing said plurality of objects on a single side of a sheet.

30. The article of manufacture of claim 26, wherein dividing the data set comprises subdividing at least one of said plurality of scan regions into multiple scan regions based upon a position of an object among said plurality of objects in relation to scan region boundaries.

31. The article of manufacture of claim 26, wherein said scan line set is a single scan line, and wherein determining if a predetermined number of object per scan line set is exceeded comprises determining if a predetermined number of objects per scan line is exceeded.

32. The article of manufacture of claim 26, wherein said scan line set comprises a scan region, and wherein determining if a predetermined number of object per scan line set is exceeded comprises determining if a predetermined number of objects per scan region is exceeded.

33. The article of manufacture of claim 26, wherein each of said plurality of objects has at least one associated presentation priority, said article of manufacture further comprising program logic for causing the control logic to perform selecting said first and second objects for merging based upon said first and second objects having close priorities.

34. The article of manufacture of claim 26, further comprising program logic for causing the control logic to perform defining a plurality of ordered criteria for object merging and selecting said first and second objects for merging by applying said criteria in order to objects among said plurality of objects within said particular scan region.

35. The article of manufacture of claim 26, wherein merging comprises creating a proxy object specifying said portion of said first object and said portion of said second object to be included within a merged object.

36. The article of manufacture of claim 26, further comprising program logic for causing the control logic to perform enforcing a minimum size for at least some of the plurality of scan regions.

37. The article of manufacture of claim 26, further comprising program logic for causing the control logic to perform combining at least two of the plurality of scan regions into a single scan region.

* * * * *